(12) United States Patent
Yousef

(10) Patent No.: US 7,821,916 B2
(45) Date of Patent: Oct. 26, 2010

(54) TIMING AND FREQUENCY ACQUISITION FOR MEDIAFLO SYSTEMS

(75) Inventor: Nabil Yousef, Foothill Ranch, CA (US)

(73) Assignee: Newport Media, Inc., Lake Forest, CA (US)

( * ) Notice: Subject to any disclaimer, the term of this patent is extended or adjusted under 35 U.S.C. 154(b) by 298 days.

(21) Appl. No.: 12/062,695

(22) Filed: Apr. 4, 2008

(65) Prior Publication Data

US 2009/0252026 A1    Oct. 8, 2009

(51) Int. Cl.
*H04J 11/00* (2006.01)
(52) U.S. Cl. ...................................................... 370/210
(58) Field of Classification Search ................ 370/210, 370/208, 211
See application file for complete search history.

(56) References Cited

U.S. PATENT DOCUMENTS

2006/0215778 A1 * 9/2006 Murthy et al. .............. 375/260

* cited by examiner

*Primary Examiner*—Derrick W Ferris
*Assistant Examiner*—Mohammad Anwar
(74) *Attorney, Agent, or Firm*—Rahman LLC

(57) ABSTRACT

An apparatus, logic, and method of performing timing and frequency estimation in a MediaFLO™ mobile multimedia multicast system comprising a receiver and a transmitter, wherein the method comprises receiving a wireless data stream comprising a MediaFLO™ mobile multimedia multicast system superframe comprising Orthogonal Frequency Division Multiplexing (OFDM) symbols; estimating a Fast Fourier Transform (FFT) trigger point for each of the received OFDM symbols; estimating a fine carrier frequency offset of each OFDM symbol; determining the start of the MediaFLO™ mobile multimedia multicast system superframe by locating a Time Division Multiplexed (TDM) pilot symbol in the superframe; estimating a coarse carrier frequency offset of each of the received OFDM symbols; and synchronizing the receiver to the start of the MediaFLO™ mobile multimedia multicast system superframe and the transmitted OFDM symbols based on the fine carrier frequency offset, the TDM pilot symbol, and the coarse carrier frequency offset.

20 Claims, 13 Drawing Sheets

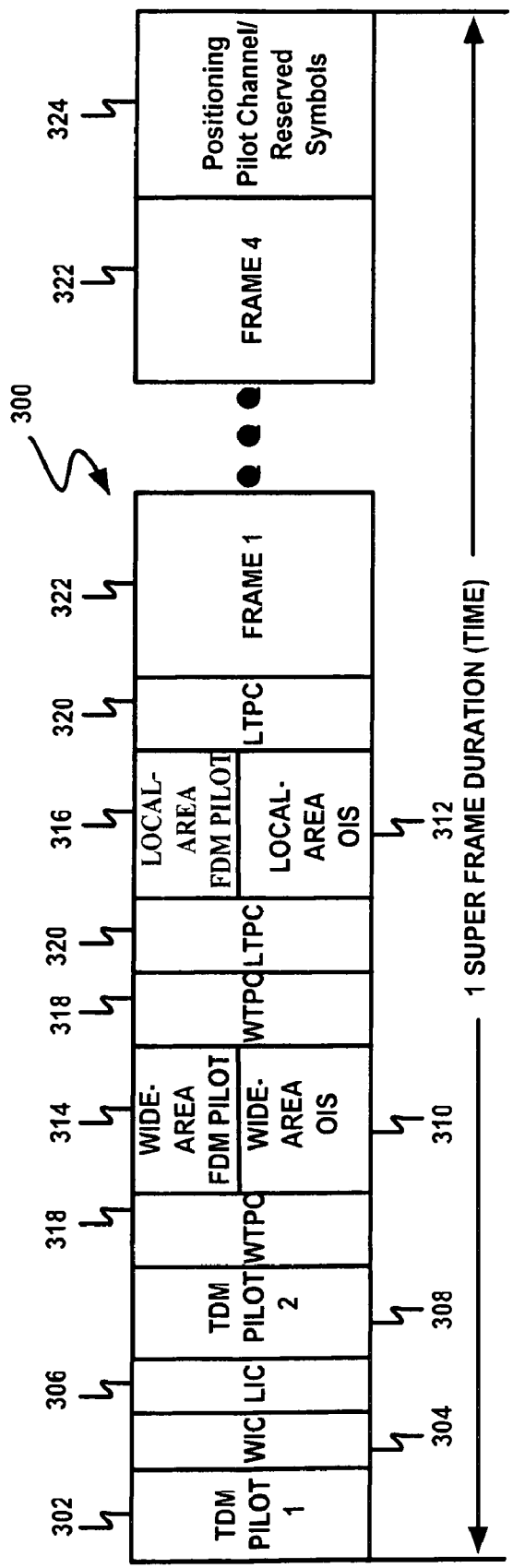
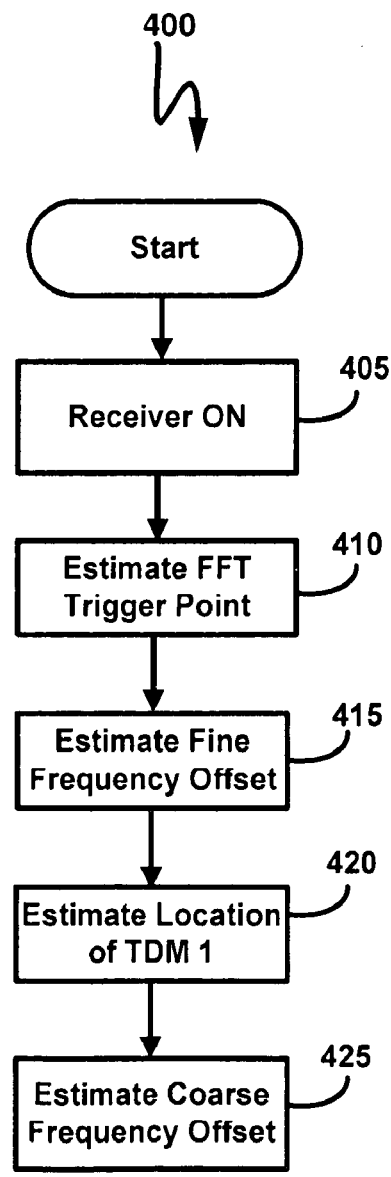

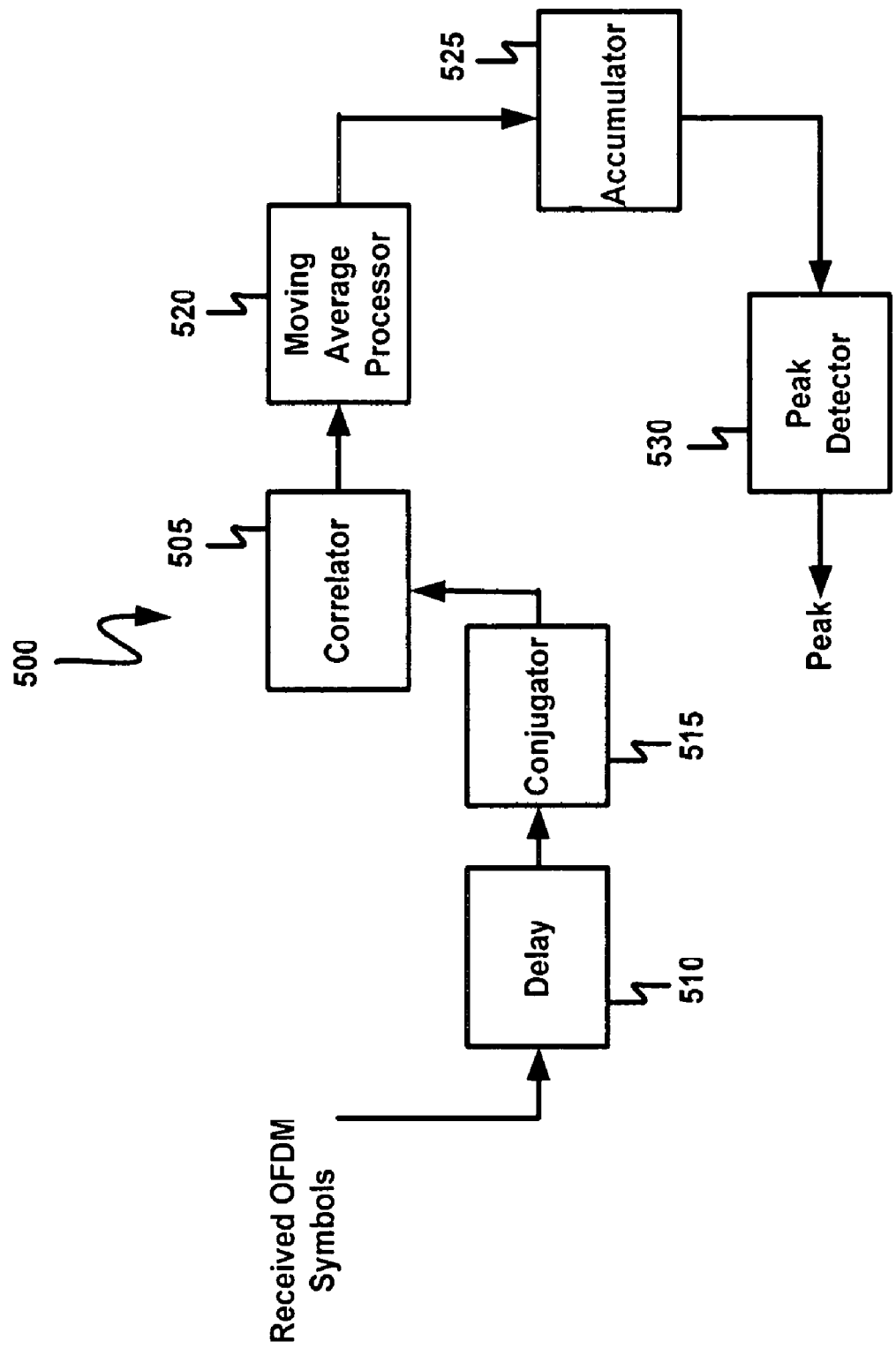

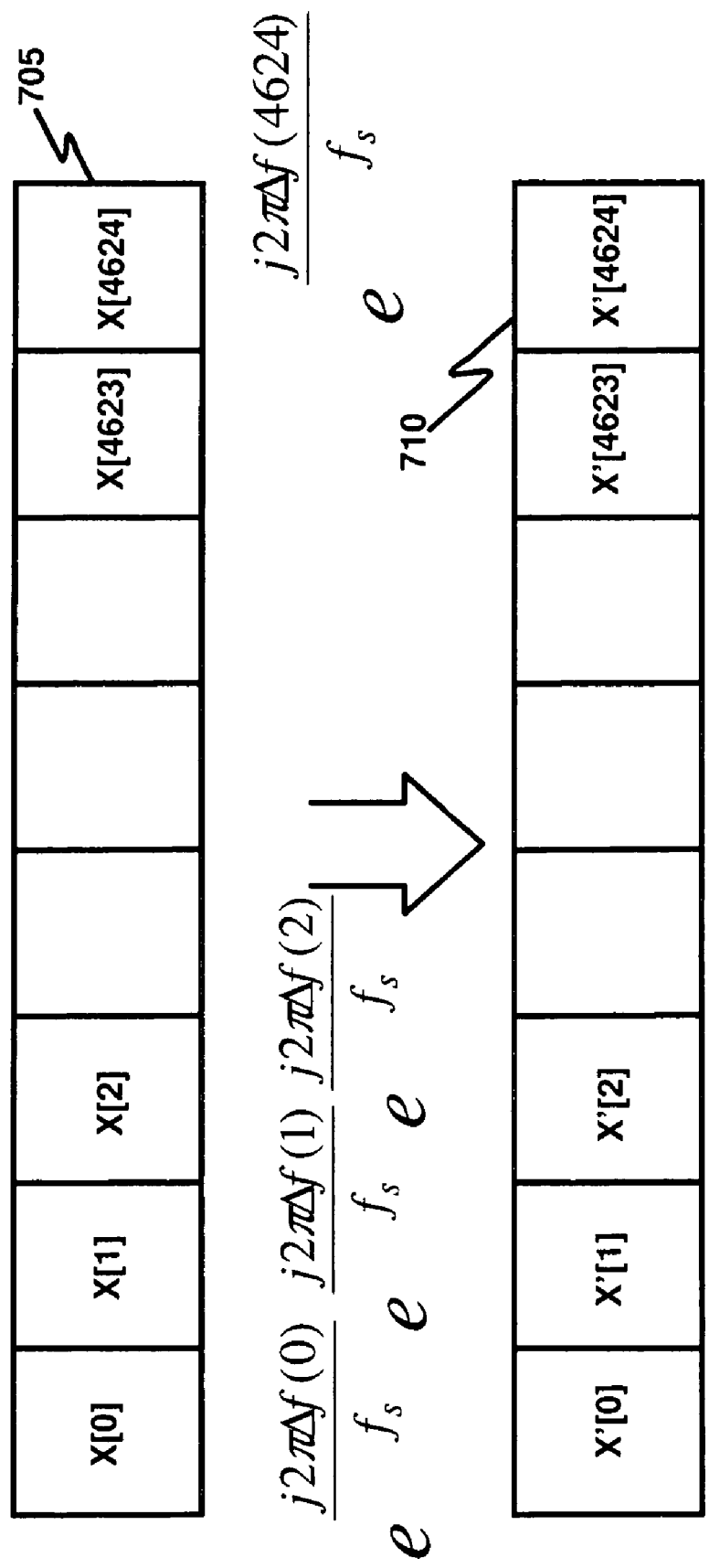

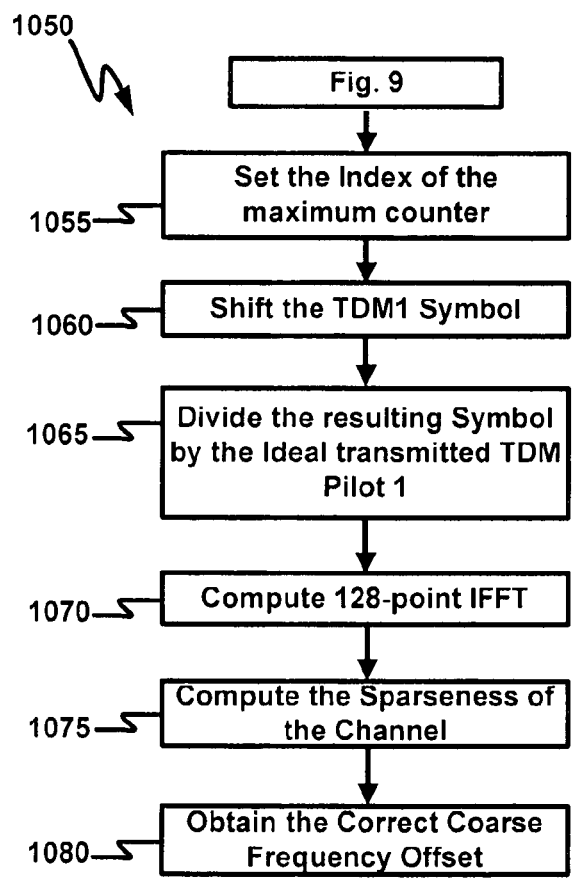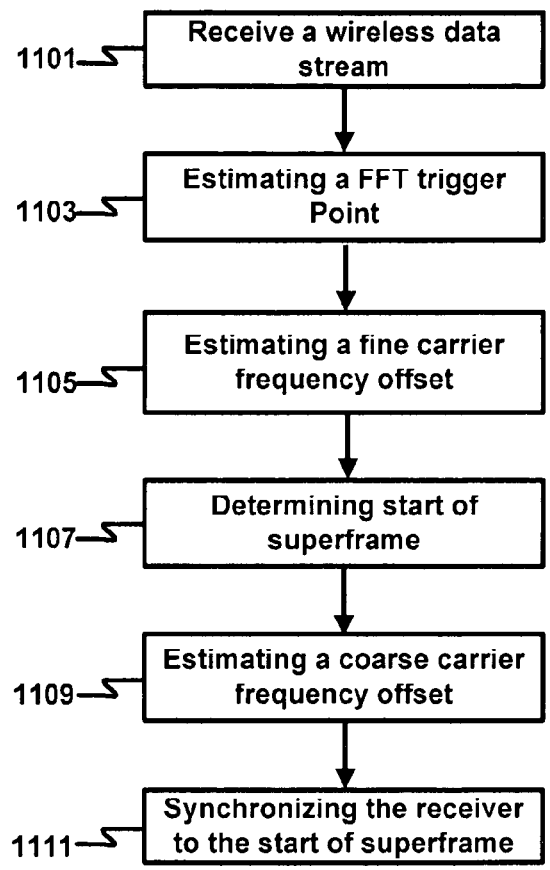

TIMING AND FREQUENCY ACQUISITION FOR MEDIAFLO SYSTEMS

BACKGROUND

1. Technical Field

The embodiments herein generally relate to wireless communications, and, more particularly, to a method and apparatus for timing and frequency acquisition in a MediaFLO™ (Forward Link Only) mobile multimedia multicast system.

2. Description of the Related Art

In recent years, the wireless industry has seen explosive growth in device capability, especially in relation to mobile devices, such as cell phones, handhelds, gaming consoles, etc. Ever-increasing demand for computing power, memory, and high-end graphic functionalities has accelerated the development of new and exciting wireless services. In the last few years, multiple technologies have been proposed to address delivery of streaming multimedia to mobile devices.

Multimedia communications provide a rich and immediate environment of image, graphics, sound, text and interaction through a range of technologies. An example of multimedia communication is streaming multimedia which is primarily a delivery of continuous synchronized media data. The streaming multimedia is constantly received by, and displayed to an end user while it is being delivered by a provider. Multiple technologies such as Integrated Services Digital Broadcasting—Terrestrial (ISDB-T), Terrestrial-Digital Multimedia Broadcasting (T-DMB), Satellite—Digital Multimedia Broadcasting (S-DMB), Digital Video Broadcasting—Handheld (DVB-H), and FLO (Forward Link Only) are used to address the delivery of streaming multimedia to mobile devices. These technologies have typically leveraged upon either third generation cellular/PCS, or digital terrestrial TV broadcast technologies.

For delivering unprecedented volumes of high-quality, streaming or clipped, audio and video multimedia to wireless subscribers, an air interface has been developed based on FLO technology for MediaFLO™ mobile multimedia multicast system available from Qualcomm, Inc., California, USA. MediaFLO™ or media forward link only is a combination of the media distribution system and the FLO technology. The FLO technology is the ability to deliver a rich variety of content choice to consumers while efficiently utilizing spectrum as well as effectively managing capital and operating expenses for service providers. The details of the Media-FLO™ mobile multimedia multicast system are available in Chari, M. et al., "FLO Physical Layer: An Overview," IEEE Transactions on Broadcasting, Vol. 53, No. 1, March 2007, the contents of which, in its entirety, is herein incorporated by reference.

FLO technology was designed specifically for the efficient and economical distribution of the same multimedia content to millions of wireless subscribers simultaneously. Also, the FLO technology was designed from the ground up to be a multicasting network, which is overlaid upon a cellular network. It does not need to support any backward compatibility constraints. Thus, both the network infrastructure and the receiver devices are separate from those for the cellular/PCS network. Moreover, as the name suggests, the technology relies on the use of a forward link (network to device) only.

FLO enables reducing the cost of delivering such content and enhancing the user experience, allowing consumers to "surf" channels of content on the same mobile handsets they use for traditional cellular voice and data services.

MediaFLO™ technology can provide robust mobile performance and high capacity without compromising power consumption. The technology also reduces the network cost of delivering multimedia content by dramatically decreasing the number of transmitters needed to be deployed. In addition, MediaFLO™ technology-based multimedia multicasting complements wireless operators' cellular network data and voice services, delivering content to the same cellular handsets used on 3G networks.

The MediaFLO™ wireless system has been designed to broadcast real time audio and video signals, apart from non-real time services to mobile users. The system complements existing networks and radically expands the ability to deliver desired content without impacting the voice and data services. Operators can leverage the MediaFLO™ system to increase average revenue per user (ARPU) and reduce churn by offering enhanced multimedia services. Content providers can take advantage of a new distribution channel to extend their brand to mobile users. Device manufacturers will benefit from increased demand for multimedia-enabled handsets as consumer appetite grows for the rich content provided through MediaFLO™ systems.

The MediaFLO™ service is designed to provide the user with a viewing experience similar to a television viewing experience by providing a familiar type of program-guide user interface. Users can simply select a presentation package, or grouping of programs, just as they would select a channel to subscribe to on television. Once the programs are selected and subscribed to, the user can view the available programming content at any time. In addition to viewing high quality video and audio content and IP data, the user may also have access to related interactive services, including the option to purchase a music album, ring tone, or download of a song featured in a music program. The user can also purchase access to on-demand video programming, above and beyond the content featured on the program guide.

The respective MediaFLO™ system transmission is carried out using tall and high power transmitters to ensure wide coverage in a given geographical area. Further, it is common to deploy 3-4 transmitters in most markets to ensure that the MediaFLO™ system signal reaches a significant portion of the population in a given market. During the acquisition process of a MediaFLO™ system data packet several determinations and computations are made to determine such aspects as frequency offsets for the respective wireless receiver. Given the nature of MediaFLO™ system broadcasts that support multimedia data acquisitions, efficient processing of such data and associated overhead information is paramount. For instance, when determining frequency offsets or other parameters, complex processing and determinations are required where determinations of phase and associated angles are employed to facilitate the MediaFLO™ system transmission and reception of data. Accordingly, there remains a need for an efficient processing of data and associated overhead information in a mobile multimedia multicast system.

SUMMARY

In view of the foregoing, an embodiment herein provides a method of performing timing and frequency estimation in a MediaFLO™ mobile multimedia multicast system comprising a receiver and a transmitter, wherein the method comprises receiving a wireless data stream comprising a Media-FLO™ mobile multimedia multicast system superframe comprising Orthogonal Frequency Division Multiplexing (OFDM) symbols; estimating a Fast Fourier Transform (FFT) trigger point for each of the received OFDM symbols; estimating a fine carrier frequency offset of each of the received OFDM symbols; determining the start of the MediaFLO™ mobile multimedia multicast system superframe by locating a Time Division Multiplexed (TDM) pilot symbol in the superframe; estimating a coarse carrier frequency offset of each of the received OFDM symbols; and synchronizing the receiver to the start of the MediaFLO™ mobile multimedia multicast system superframe and the transmitted OFDM symbols based on the fine carrier frequency offset, the TDM pilot symbol, and the coarse carrier frequency offset.

Preferably, estimating the FFT trigger point for each of the received OFDM symbols comprises receiving OFDM signal samples; delaying and conjugating a received signal sample; correlating the received signal sample with the delayed and conjugated signal sample; applying a moving average process to the result of the correlation; accumulating each symbol duration; and determining if N symbols have been accumulated, wherein N comprises a number of OFDM symbols. Moreover, the method may further comprise detecting a peak of a resulting OFDM symbol from the moving average process; and storing an index of the detected peak. Additionally, estimating the fine carrier frequency offset of each the received OFDM symbols may comprise obtaining an angle of a detected peak of a resulting OFDM symbol; and computing a frequency offset $\Delta f$.

Preferably, the computing of the frequency offset $\Delta f$ is derived using an angle of peak of a correlator output equaling to $2\pi\Delta f\, N_{FFT}/f_s$. Also, the location of the TDM pilot symbol may be determined by initializing a sparseness index value and a symbol number value to zero; dividing the received OFDM symbols into 125 chunks of 32 carriers each; determining the value and location of a peak within a chunk for each of the chunks, except for the first and the last three chunks; incrementing a counter corresponding to the number of location of peaks of the chunks is repeated; accumulating the power of the peak into a first peak power accumulator and the power within a remainder of the chunk into a second accumulator; determining a sparseness index ratio, wherein the sparseness index ratio comprises a ratio of the power in the peaks to the power in the remainder of the chunks; and determining whether the sparseness index ratio is greater then the sparseness index value.

The method may further comprise setting the sparseness index value equal to the sparseness index ratio; and determining if the symbol number is equal to 1200. Additionally, the method may further comprise obtaining the TDM pilot symbol of the OFDM symbol having the highest sparseness index value. Moreover, the estimating of the coarse carrier frequency offset of each of the received OFDM symbols may comprise counting the number of times a value of a peak of the OFDM symbols is repeated; obtaining an index of the peak with the maximum count, and setting the index with the maximum count as a candidate coarse frequency offset; shifting the TDM pilot symbol by each possible frequency offset; dividing the shifted TDM pilot symbol by an ideal transmitted TDM pilot symbol; computing a 128-point Inverse Fast Fourier Transform (IFFT) process of the result of the division process; computing a sparseness of a transmission channel of the wireless data stream in a time domain for all possible offsets; and obtaining a correct coarse frequency offset corresponding to the transmission channel with the highest sparseness value.

Another embodiment includes logic encoded in one or more tangible media for execution and operatively connected to a MediaFLO™ (Forward Link Only) mobile multimedia multicast system receiver, and when executed, the logic operable for performing the method of timing and frequency estimation in a MediaFLO™ mobile multimedia multicast system. A further embodiment includes an apparatus for performing timing and frequency estimation in a MediaFLO™ (Forward Link Only) mobile multimedia multicast system comprising a receiver and a transmitter, wherein the apparatus comprises comprising a processor adapted to receive a wireless data stream comprising a MediaFLO™ mobile multimedia multicast system superframe comprising Orthogonal Frequency Division Multiplexing (OFDM) symbols; estimate a Fast Fourier Transform (FFT) trigger point for each of the received OFDM symbols; estimate a fine carrier frequency offset of each of the received OFDM symbols; determine the start of the MediaFLO™ mobile multimedia multicast system superframe by locating a Time Division Multiplexed (TDM) pilot symbol in the superframe; estimate a coarse carrier frequency offset of each of the received OFDM symbols; and synchronize the receiver to the start of the MediaFLO™ mobile multimedia multicast system superframe and the transmitted OFDM symbols based on the fine carrier frequency offset, the TDM pilot symbol, and the coarse carrier frequency offset.

Furthermore, the location of the TDM pilot symbol may be determined by initializing a sparseness index value and a symbol number value to zero; dividing the received OFDM symbols into 125 chunks of 32 carriers each; determining the value and location of a peak within a chunk for each of the chunks, except for the first and the last three chunks; incrementing a counter corresponding to the number of location of peaks of the chunks is repeated; accumulating the power of the peak into a first peak power accumulator and the power within a remainder of the chunk into a second accumulator; determining a sparseness index ratio, wherein the sparseness index ratio comprises a ratio of the power in the peaks to the power in the remainder of the chunks; and determining whether the sparseness index ratio is greater then the sparseness index value.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 3 illustrates a FLO superframe structure for a MediaFLO™ system according to an embodiment herein;

FIG. 4 is a flow diagram illustrating a method for timing and frequency acquisition in a MediaFLO™ system according to an embodiment herein;

FIG. 5A is a block diagram of an FFT trigger point estimation process of the method of FIG. 4 according to an embodiment herein;

FIG. 7A illustrates the effect of carrier offset on OFDM symbols being received according to an embodiment herein;

FIG. 10B is a flow diagram illustrating a method for estimating coarse frequency offset in a MediaFLO™ system according to an embodiment herein;

FIG. 11 is a flow diagram illustrating a preferred method according to an embodiment herein.

DETAILED DESCRIPTION OF PREFERRED EMBODIMENTS

Figure 1:
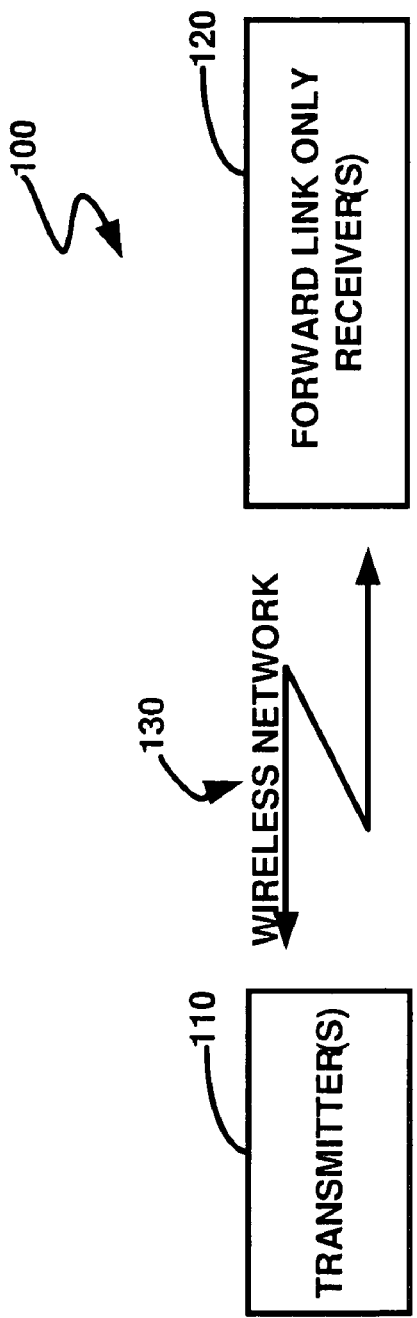
FIG. 1 illustrates a FLO system for a MediaFLO™ system according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for an efficient processing of data and associated overhead information in a mobile multimedia multicast system. The embodiments herein achieve this by providing an efficient technique of timing and frequency acquisition form the received superframes. Referring now to the drawings, and more particularly to FIGS. 1 through 12, where similar reference characters denote corresponding features consistently throughout the figures, there are shown preferred embodiments.

The FLO system is comprised of two parts: (a) The FLO network, which includes the collection of transmitters and the backhaul network, and (b) The FLO device, which may be any type of communicating devices such as a cell phone, computer, personal assistant, laptop, handheld, or gaming consoles, etc. FIG. 1 illustrates a FLO system 100 for a MediaFLO™ system. The system 100 includes one or more transmitters 110 that communicate across a wireless network 130 to one or more receivers 120.

The FLO system 100 is utilized in developing an air interface for the MediaFLO™ mobile multicast system. The air interface uses Orthogonal Frequency Division Multiplexing (OFDM) as the modulation technique, which is also utilized by Digital Audio Broadcasting (DAB), (DVD-T), and (ISDB-T).

To ensure that the user experience is as uniform as possible over the entire coverage area and optimize spectral efficiency and network economics, FLO system 100 employs the concept of Single Frequency Network (SFN) operation.

The FLO system 100 multicasts several services. A service is an aggregation of one or more related data components, such as the video, audio, text or signaling associated with a service. In an embodiment, the services are classified into two types based on their coverage area: Wide-area services and Local-area services. A Local-area service is multicast for reception within a metropolitan area. By contrast, Wide-area services are multicast in one or more metropolitan areas. The term Local-area is used to denote the transmitters within a metropolitan area. The term Wide-area is used to denote transmitters in one or more metropolitan areas that multicast the same Wide-area services. Thus, a Wide-area contains one or more Local-areas, with the transmitters in the different Local-areas multicasting different local area services and in an embodiment, using different radio frequency (RF) center frequencies.

FLO services are carried over one or more logical channels. These logical channels are called Multicast Logical Channels (MLC). An important aspect is that MLCs are distinguishable at the physical layer. For example, the video and audio components of a given service can be sent on two different MLCs. A FLO device (a receiver from the plurality of receivers 120) that is interested in the audio component can only receive the corresponding MLC without receiving the MLC for the video component, thereby saving battery resources.

The statistical multiplexing of different services, or MLCs, is achieved by varying only the MLC time and frequency allocations over prescribed time intervals to match the variability in the MLC's source rates. Statistical multiplexing in FLO enables the receivers 120 to demodulate and decode only the MLC(s) of interest.

The data rates required by the services are expected to vary over a wide range, depending on their multimedia content. Thus, effective use of statistical multiplexing can significantly increase the number of services supported by a multicast system using a specified channel bandwidth.

Figure 2:
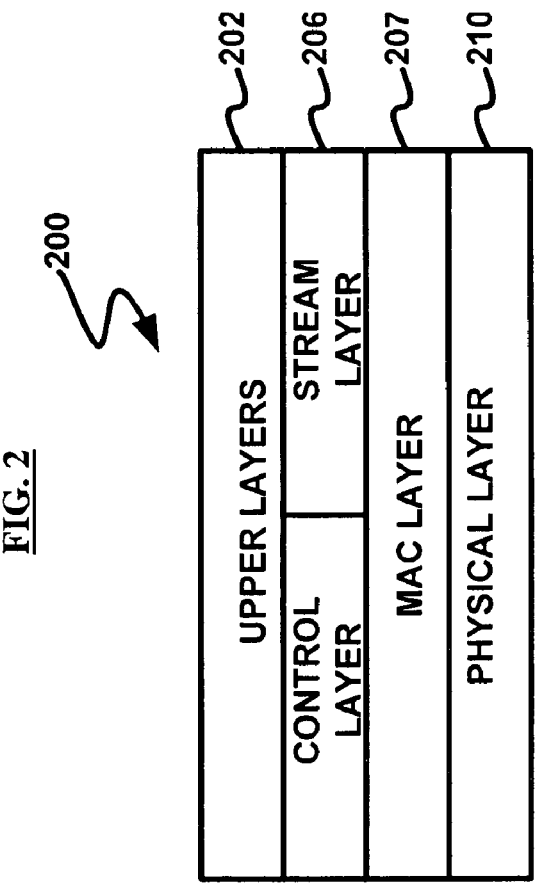
FIG. 2 illustrates a layering architecture for an air interface of a FLO system according to an embodiment herein.

FIG. 2 illustrates a layering architecture 200 for an air interface of a FLO system. The air interface is layered with the interface defined for each layer. The layers are as follows:

The upper layers 202 provide multiple functions including compression of multimedia content, access control to multimedia, and content and formatting of control information. The Medium Access Control (MAC) layer 207 controls access to the physical layer 210, performs the mapping between logical channels and physical channels, multiplexes logical channels for transmission over the physical channel, de-multiplexes the logical channels at the mobile device, and enforces Quality of service (QOS) requirements.

The stream layer (and accompanying control layer) 206 provides binding of the upper layers 202 packets to streams of each logical channels and packetization residual error handling functions. The physical layer 210 provides channel structure for the forward link and defines frequency, modulation, and encoding requirements.

At each transmitter 110 (of FIG. 1), the transmitted MLCs of the FLO system 100 (of FIG. 1) are organized as superframes. In an embodiment, a superframe is of one second duration and comprises 1200 OFDM symbols of 0.833 ms duration each. In an embodiment, each superframe comprises 200 OFDM symbols per MHz of allocated bandwidth, as each of the OFDM symbol is of 0.833 ms duration.

FIG. 3 illustrates a FLO superframe structure 300 for a MediaFLO™ system. The transmission and reception in the FLO system are based on using 4096 (4K) subcarriers. The selection of 4096 subcarriers in FLO provides superior mobile performance compared to 2048 (2K) and 8192 (8K) subcarriers. Of the 4096 subcarriers, 96 are unused and referred to as guard subcarriers. The remaining 4000 subcarriers are referred to as active subcarriers, which are modulated by data or pilot symbols. In an embodiment, these 4000 active subcarriers are further equally divided into eight disjoint groups called interlaces. One interlace from the group is assigned to the Frequency Division Multiplexing (FDM) pilot and is used for channel estimation. The remaining seven interlaces are available for modulation with data symbols. The pilot and data subcarriers are modulated with symbols that have the same energy in the FLO system. These interlaces are allocated to MLC(s) and enable frequency-division multiplexing. Since, the subcarriers within an interlace span the total FLO signal bandwidth there is no loss of frequency diversity.

Forward error correction and coding can also be used to gain the benefit of OFDM over time/frequency-selective channels. In an embodiment, the FLO design uses a concatenated coding scheme, comprising of an outer Reed Solomon (RS) code and an inner Parallel Concatenated Convolution code (PCCC), also called as a turbo code.

As illustrated in FIG. 3, a superframe is divided into Time Division Multiplexed (TDM) pilot OFDM symbols, frequency division multiplexed (FDM) pilot channel with Overhead Information symbols (OIS) channel, Transition Pilot Channels (TPC) symbols 318, 320, data channels 322, and Positioning Pilot Channel (PPC) 324.

There are four TDM pilot OFDM symbols namely TDM pilot 1 (TDM1) 302, Wide-area Identification Channel (WIC) 304, Local-area Identification Channel (LIC) 306, and TDM pilot 2 (TDM2) 308.

The OIS channel is divided into two sections namely the Wide-area OIS channel 310, and Local-area OIS channel 312, each comprising five OFDM symbols that carry overhead information. The Wide-area OIS channel 310 contains information about those MLCs that are common to the wide area, while the Local-area OIS channel 312 contains information about those MLCs that are common to specific local coverage areas.

Similar to the OIS channel, a FDM pilot channel is divided into two sections namely the Wide-area FDM pilot channel 314 and the Local-area FDM pilot channel 316. The TPCs 318, 320 are symbols flanking each continuous portion of the Local-area OIS 312, Wide-area OIS 310, Local-area data frames and Wide-area data frames. The TPC symbols 318, 320 are used to assist channel estimation for demodulation of the data OFDM symbol adjacent to them.

The four data channels 322 occupy a substantial portion of the superframe 300 and carry the multicast multimedia information to the FLO receivers 120 of FIG. 1. The PPC 324 forms the last portion of a superframe 300 and comprises 2, 6, 10, or 14 OFDM symbols. The PPC symbol 324 is unique for each transmitter 110 of FIG. 1 and in an embodiment, is used for transmitter identification. In an embodiment the PPC 324 is used for position location of the receiving device using triangulation methods.

At the FLO receivers 120 of FIG. 1, the superframe 300 of FIG. 3 is processed for the timing and frequency acquisition.

FIG. 4 is a flow diagram illustrating one embodiment of a method 400 for timing and frequency acquisition in a MediaFLO™ system. At block 405 the receivers (one 120 being powered on begin the acquisition process. Next, at a block 410, the receivers 120 estimate a Fast Fourier Transform (FFT) trigger point which indicates the start of each OFDM symbol. Moving to block 415, the receivers 120 estimate a fine frequency offset. At block 420, the receivers 120 estimate the location of the TDM1 302 of FIG. 3. Next, at block 425, the receivers 120 estimate a coarse frequency offset. The fine and coarse frequency offsets are offsets due to imperfections in crystal oscillators of the receivers 120.

Figure 5B:
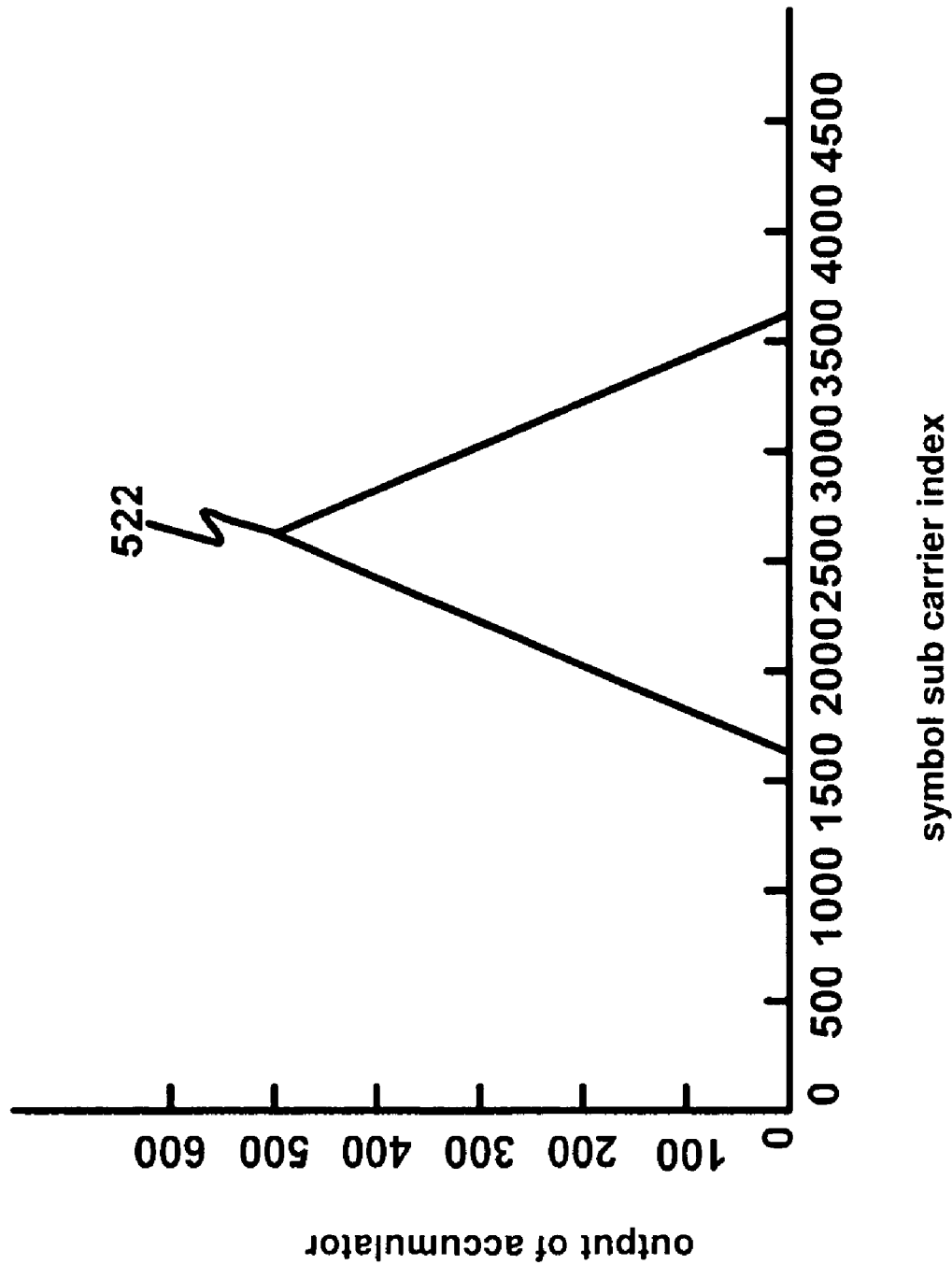
FIG. 5B is a graphical representation illustrating a well defined peak of an OFDM symbol detected by a peak detector according to an embodiment herein.

FIG. 5A is a block diagram 500 of the FFT trigger point estimation process of block 410 of FIG. 4. The FFT trigger point is estimated by correlating the received data samples and a delayed and conjugated version of the received data samples using a correlator 505. The received data samples are delayed by a delay 510 equal to the FFT size ($N_{FFT}$), which is, for example, 4096 in the MediaFLO™ system and conjugated by a conjugator 515. A moving average process is then applied by a moving average processor 520 to the correlated sample. The moving average window size is chosen to be twice the guard interval (2×512=1024) to accommodate a long channel effect. An accumulator 525 performs a fold-and-add operation over N symbols of the moving average processed sample to average out the effect of noise. A peak detector 530 detects a peak at the start of the useful data portion of the OFDM symbol. In an embodiment, for an echo channel, the output of the correlator 505 or the moving average processor 520 has a well-defined peak 522 as illustrated in FIG. 5B, at the start of the useful portion of the OFDM symbol. This well-defined peak is the FFT trigger point.

Figure 5D:
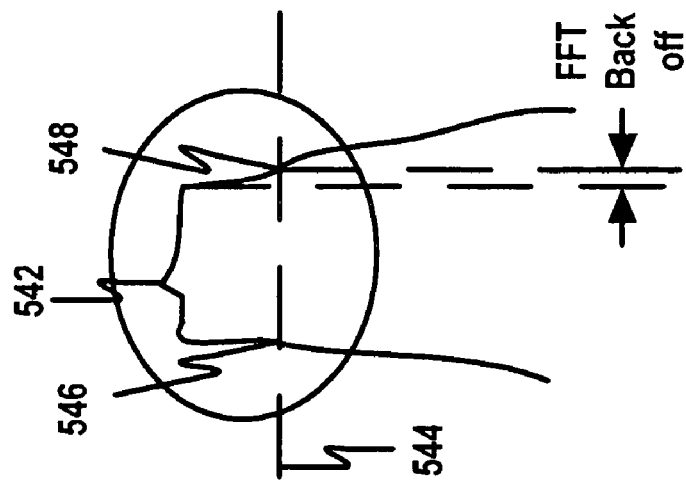
FIG. 5D is an exploded view of the encircled area of FIG. 5C according to an embodiment herein.
Figure 5C:
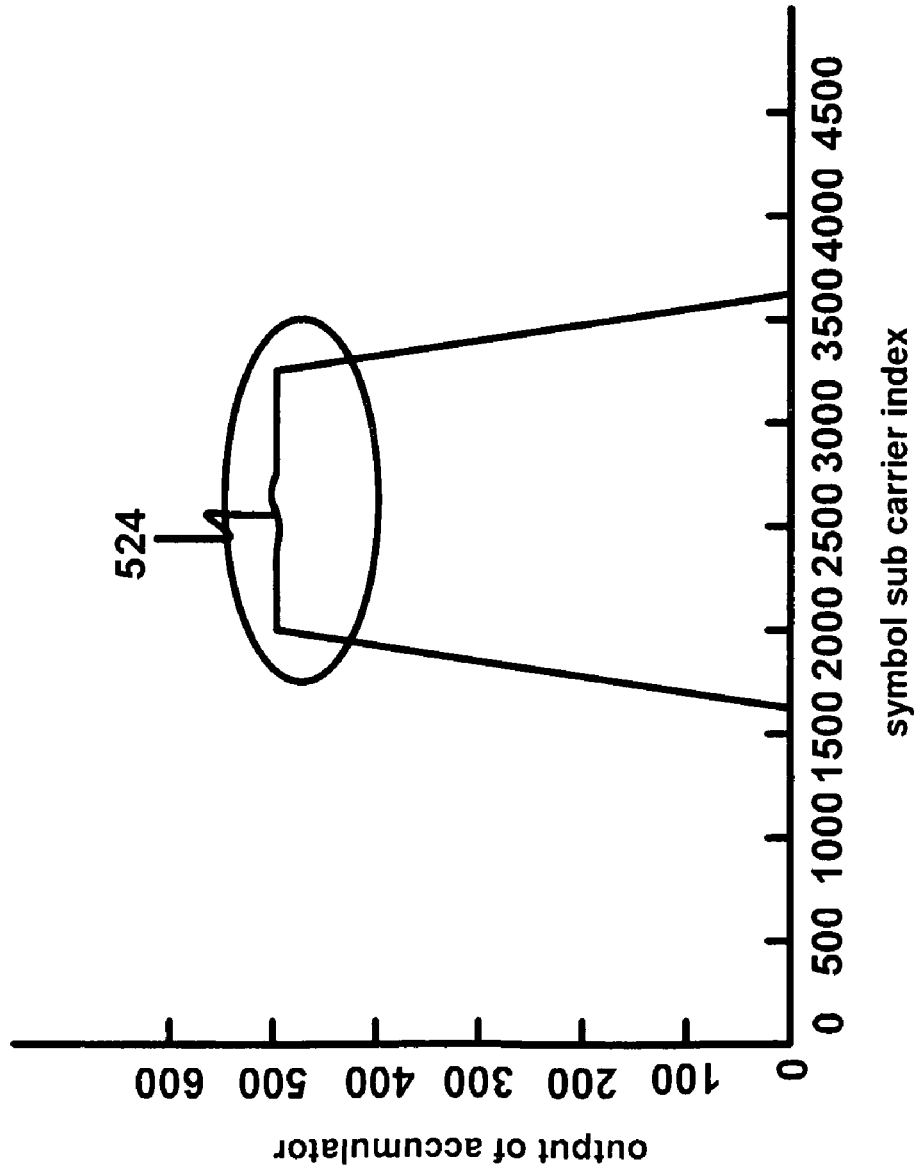
FIG. 5C is a graphical representation illustrating a flat range of an OFDM symbol detected by a peak detector according to an embodiment herein.

In an embodiment, short channels such as the additive white Gaussian noise (AWGN) or some of the other channel profiles defined in the MediaFLO™ standard, the resulting output of the correlator 505 of FIG. 5A or the moving average processor 520 of FIG. 5A has a flat range 524 as illustrated in FIG. 5C, where FFT triggering is allowed anywhere within the flat range 524. In order to obtain more accurate triggering point; i.e., a point close to the start of the useful portion of the OFDM symbol, the peak of the flat range 542 as illustrated in FIG. 5D, is first determined. A line 544 corresponding to a specific percentage of the peak (for e.g., 96%) is drawn and the two intercept points 546, 548 of the line 544 with the resulting output of the correlator 505 of FIG. 5A are determined. The point which is away from the second intercept point 548 is chosen as the FFT trigger point by a FFT back-off factor. The FFT back-off factor in an embodiment is a programmable value.

In an embodiment, the difference between the two intercept points 546, 548 is an indicator for the channel length. This estimate of the channel length can be useful in determining the initial choice for a frequency domain interpolation filter that can be used with an equalizer.

Figure 6:
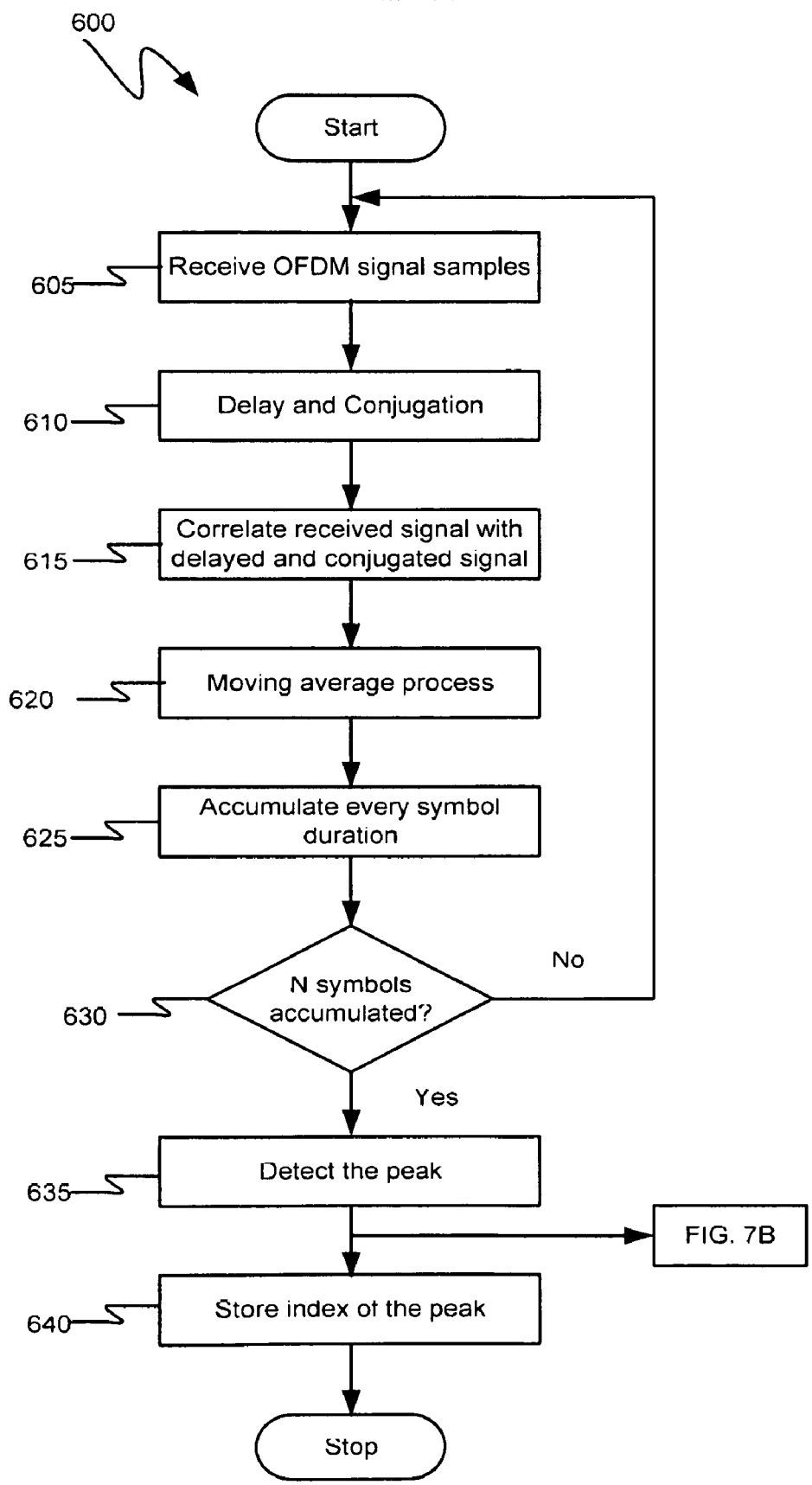
FIG. 6 is a flow diagram illustrating a method for FFT trigger point estimation in a MediaFLO™ system according to an embodiment herein.

FIG. 6 is a flow diagram illustrating one embodiment of a method 600 for FFT trigger point estimation in a MediaFLO™ system. At block 605, the receivers 120 of FIG. 1 receive OFDM signal samples. Next, at block 610, the received signal samples are delayed to be equal to the FFT size ($N_{FFT}$), which is, for example, 4096 in the MediaFLO™ system. At 615, the received signal samples are correlated with the delayed and conjugated signal samples. Moving to block 620, a moving average process is then applied to the correlated signal samples. In an embodiment, the moving average window size is twice the guard interval. At block 625, duration of every symbol is accumulated. Next, at block 630, it is determined if N symbols have been accumulated. At block 630, if N symbols have been accumulated (Yes), the process of block 635 occurs, else (No) the process of blocks 605 through 630 restart. At block 635, a peak at the start of the useful data portion of the OFDM symbol is determined. Next, at block 640, index of the peak determined is stored in a memory.

FIG. 7A illustrates the effect of carrier offset on OFDM symbols being received. As illustrated, the OFDM symbol 705 is the symbol with no carrier offset and the OFDM symbol 710 is the symbol with carrier offset.

In an embodiment, during the trigger point estimation process, each two ticks that are $N_{FFT}$ away from each other are multiplied by each other after conjugating the older of them. Thus, it can be observed that the output of the correlator 505 of FIG. 5A or the moving average processor 520 of FIG. 5A, at its peak has a phase given by $-2\pi\Delta f N_{FFT}/f_s$, where $\Delta f$ is the carrier offset and $f_s$ is the chip rate. Therefore, the frequency offset $\Delta f$ can be determined by using the relation:

$$\text{angle of peak of correlator output} = \frac{2\pi\Delta f N_{FFT}}{f_s} \quad (1)$$

In the MediaFLO™ systems the fine frequency offset needs to be tracked accurately by the receiver 120 of FIG. 1 until the receiver 120 of FIG. 1 locks to the beginning of a MediaFLO™ superframe. In case the fine frequency offset is estimated only once, the receiver may not be able to lock because of possible drift in the receiver carrier frequency. Such drift could be caused by temperature changes. To overcome this problem, the fine frequency estimation should preferably be continuously estimated and corrected every N OFDM symbols. In an example, N is approximately 15-20 symbols.

Figure 7B:
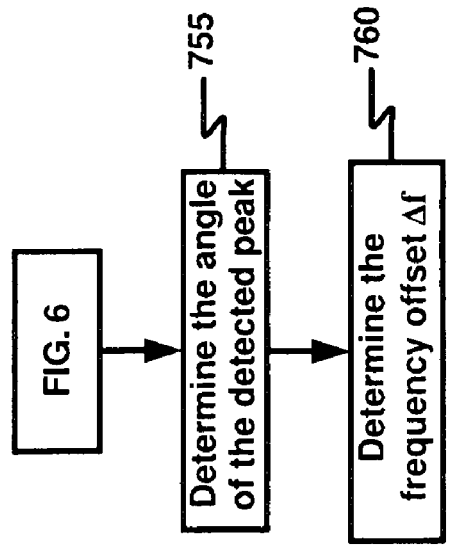
FIG. 7B is a flow diagram illustrating a method for fine carrier frequency offset estimation in a MediaFLO™ system according to an embodiment herein.

FIG. 7B is a flow diagram illustrating one embodiment of a method for fine carrier frequency offset estimation MediaFLO™ system. At block 755, an angle of the peak of the sample is determined by the peak detector of FIG. is obtained. Next, at block 760, the frequency offset $\Delta f$ is determined using the relation (1).

By re-arranging the relation (1), it is observed that $\Delta f=(L+\epsilon)*f_s/N_{FFT}$, where L is an integer and $\epsilon$ is a fraction. As the relation (1) can be used to estimate the fractional component $\epsilon$, the same is applicable for estimating the fine carrier frequency offset component.

Figure 8A:
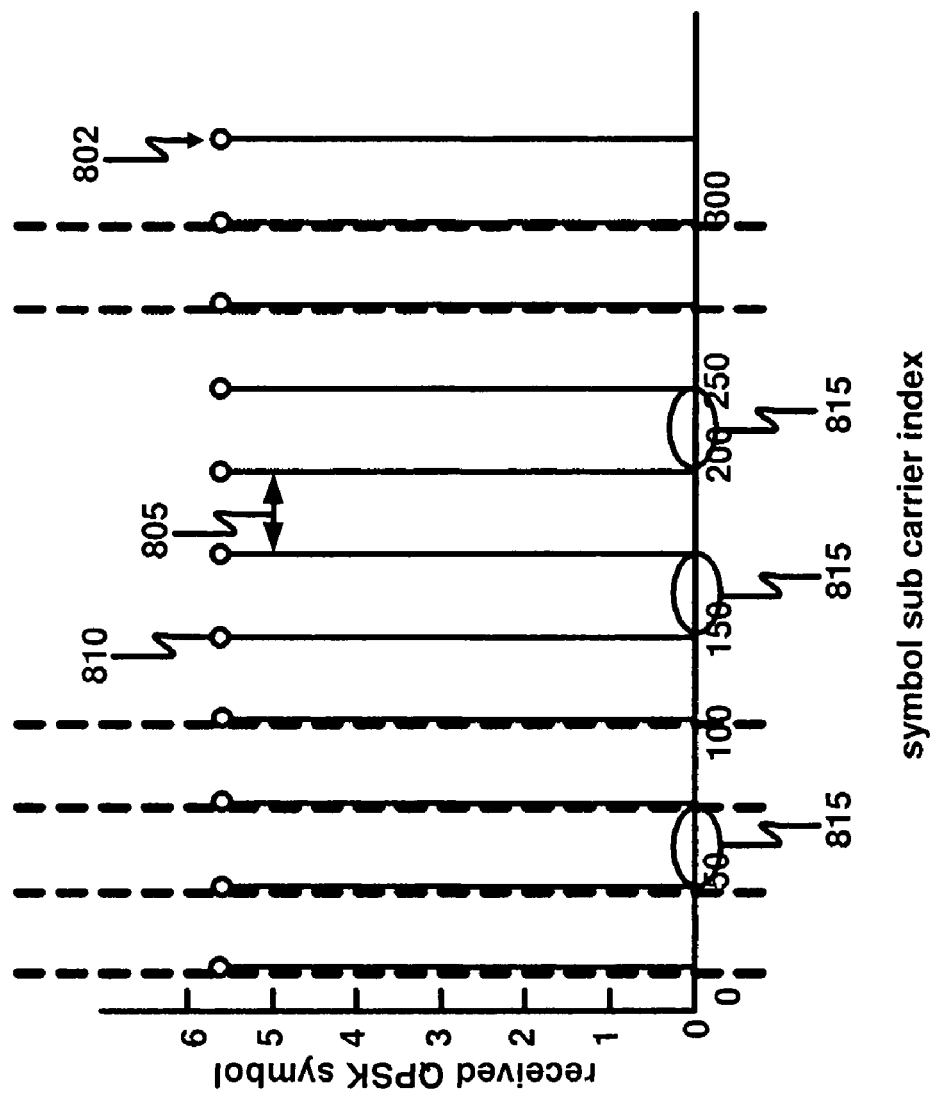
FIG. 8A illustrates a time division multiplexing (TDM) pilot 1 divided into chunks according to an embodiment herein.

The start of a MediaFLO™ superframe can be determined if the location of the TDM pilot 1 is determined. FIG. 8A illustrates the structure of a TDM pilot 1 in the frequency domain. The TDM pilot 1 comprises 124 non-zero sub-carriers, which are 32 bins away from each other. Each sub-carrier carries a quadrature phase-shift keying (QPSK) symbol 802. The locations of non-zero sub-carriers among the 4096 carriers are 64, 96 . . . 2016, 2080, 2112 . . . 4032.

FIG. 8A illustrates a TDM pilot 1 divided into chunks in accordance with an embodiment. As illustrated, the TDM pilot 1 is divided into 125 chunks 805 of 32 carriers each such that for the correct TDM pilot 1 with 0 carrier offset, the first sample is the location of the first non-zero sub-carrier. The power of the peak 810 and rest of the chunk 815 is used to compute a ratio of the power in the peaks 810 to the power in the rest of the chunk 815.

Figure 8B:
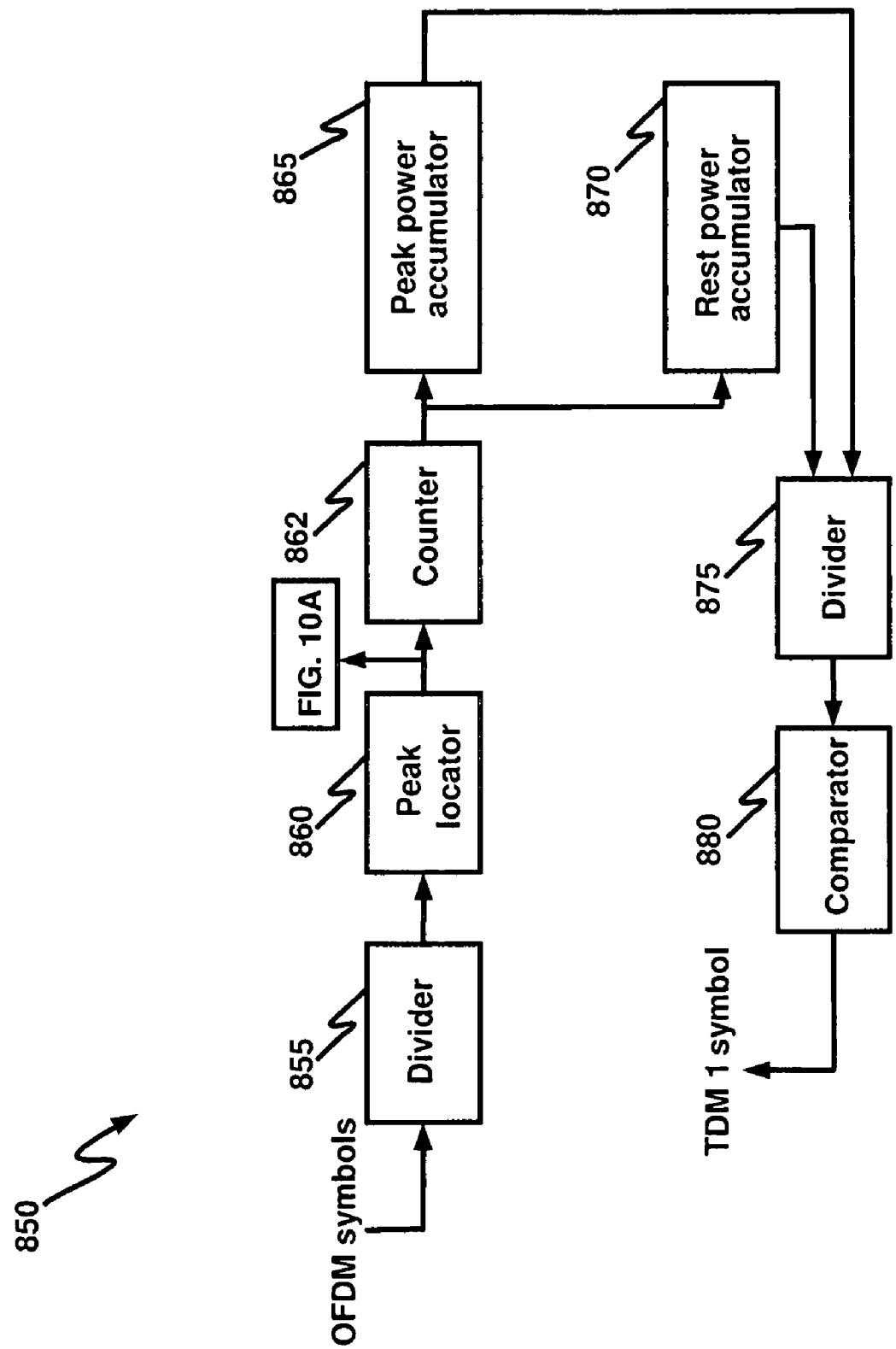
FIG. 8B illustrates a block diagram for a TDM pilot 1 estimation process according to an embodiment herein.

FIG. 8B illustrates a block diagram 850 for a TDM pilot 1 estimation process in accordance with an embodiment. A divider 855 divides the TDM pilot 1 into 125 chunks of 32 carriers each. The received symbol is divided such that for the correct TDM pilot 1 with 0 carrier offset, the first sample is the location of the first non-zero sub-carrier. The resulting output of the divider 855 is provided to a peak locator 860. The peak locator 860 locates the location of the peak 810 of FIG. 8A and its value within a chunk 805 of FIG. 8A for each chunk, except for the first and the last three chunks. A counter 862 is incremented corresponding to the number of locations of the peaks 810 of FIG. 8A of the chunks 805 of FIG. 8A and are repeated. The power of the peak 810 of FIG. 8A is accumulated in a peak power accumulator 865 and the power of the rest of the chunk 815 of FIG. 8A is accumulated in a rest of the chunk power accumulator 870. A divider 875 divides the peak power accumulated by the rest of the chunk power accumulated to compute a ratio of the power in the peaks to the power in the rest of the chunk, also called as a sparseness index. A comparator 880 is used to compare the previously computed Sparseness Index and the sparseness index computed newly. The TDM pilot 1 symbol of the OFDM symbol having the highest sparseness index is then obtained.

Figure 9:
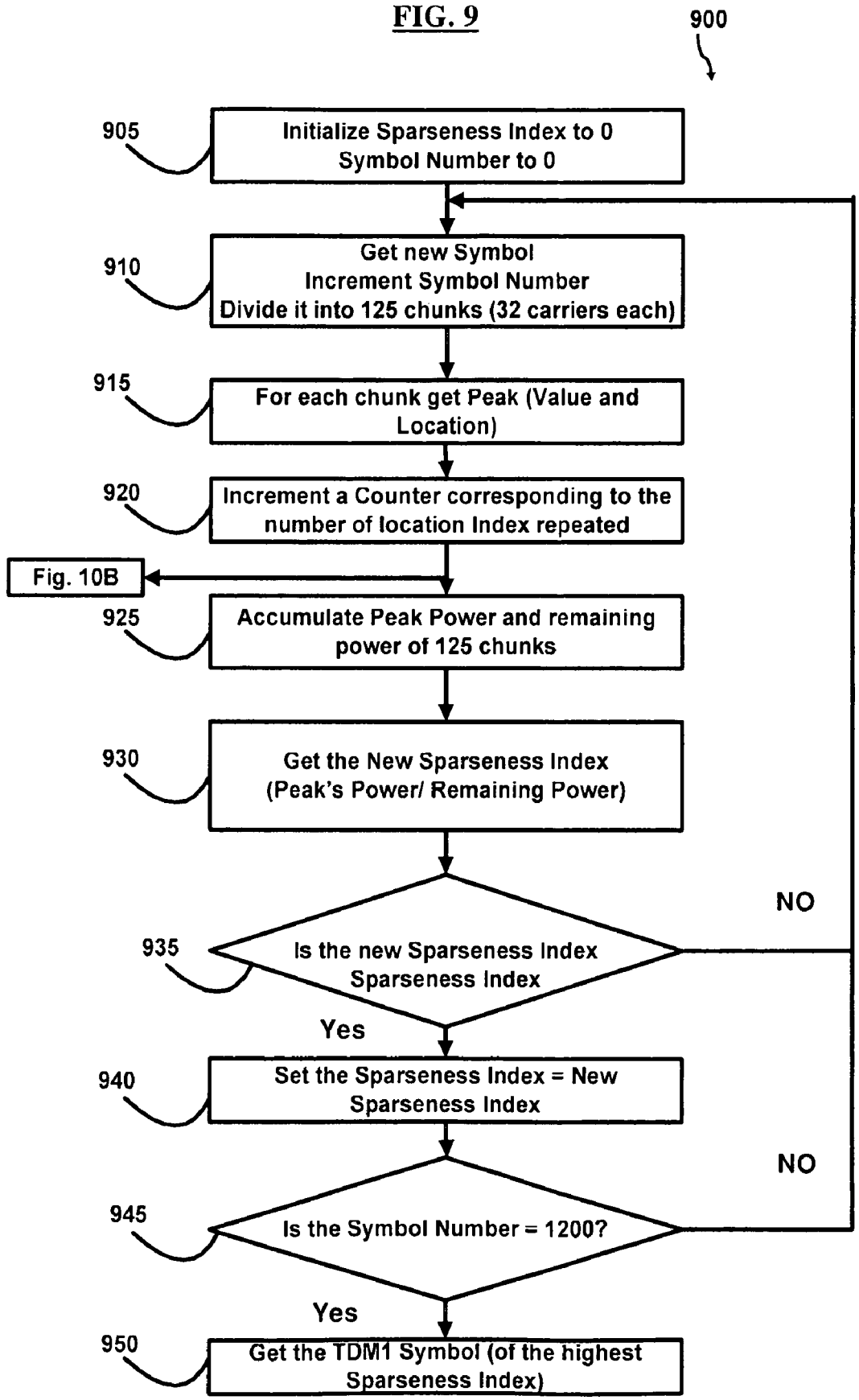
FIG. 9 is a flow diagram illustrating a method for estimating TDM pilot 1 location in a MediaFLO™ system according to an embodiment herein.

FIG. 9 is a flow diagram illustrating one embodiment of a method 900 for estimating TDM pilot 1 location in a MediaFLO™ system. At block 905, the value of Sparseness index and Symbol Number are initialized to 0. Next, at block 910, each received symbol is divided into 125 chunks of 32 carriers each. At block 915, the location of the peak and its value within a chunk are determined for each chunk, except for the first and the last three chunks. Moving to block 920, a counter is incremented corresponding to the number of location of the peaks of the chunks is repeated. At block 925, the power of the peaks and power within rest of the chunks are accumulated in separate accumulators. Next, at block 930, a New Sparseness index which is the ratio of the power in the peaks to the power in the rest of the chunk is obtained. At block 935, it is determined if the New Sparseness index is greater than the earlier obtained highest Sparseness index. Moving to block 940, if the New Sparseness index is greater than the earlier obtained highest Sparseness index, the New Sparseness index is set as the highest Sparseness index. If, at block 940, the New Sparseness index is not greater than the earlier obtained highest Sparseness index, the process from blocks 910 through 935 are repeated. At block 945, it is determined if Symbol Number is equal to 1200. If the Symbol Number is equal to 1200 then at block 950, the TDM pilot 1 symbol of the highest Sparseness index is obtained.

Figure 10A:
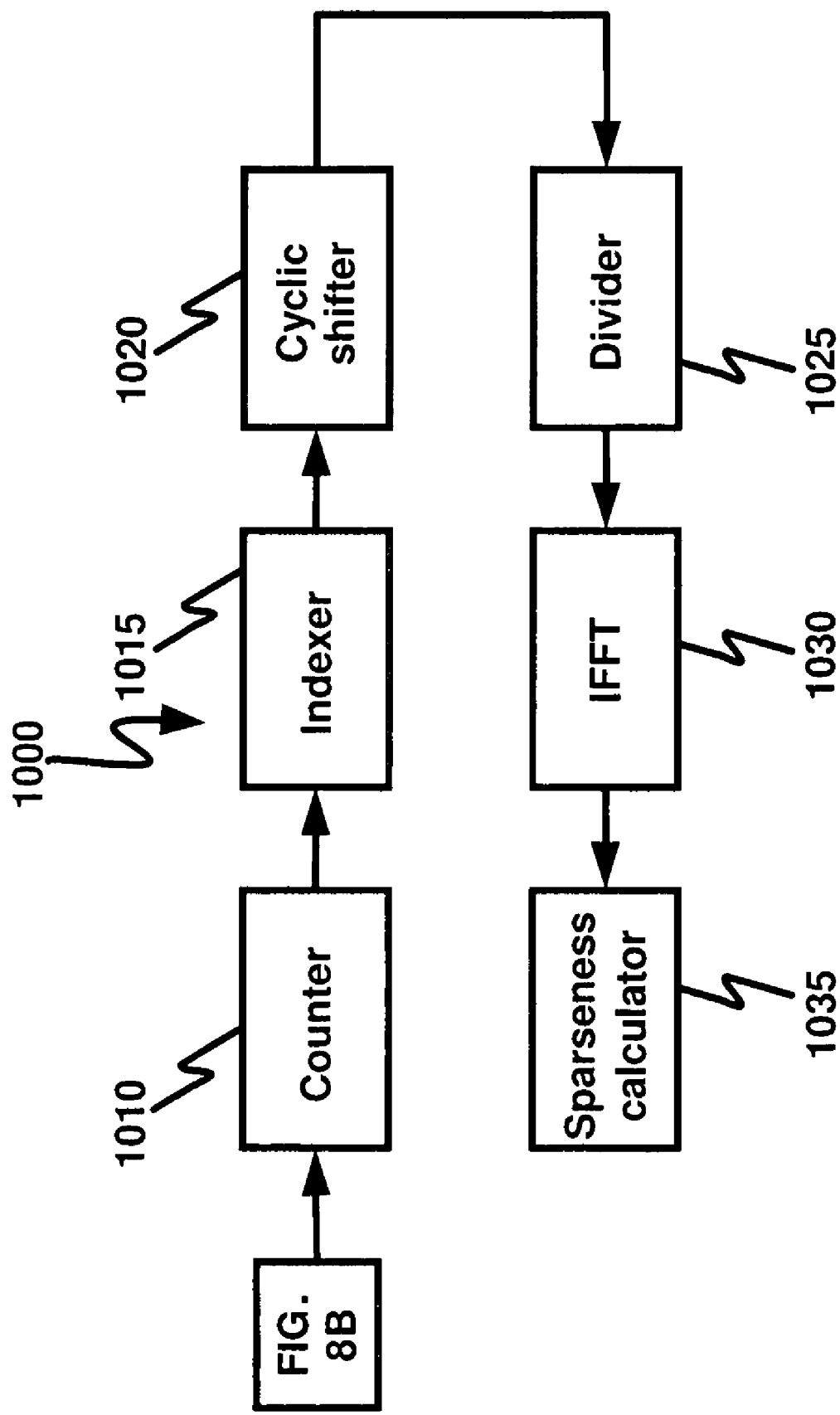
FIG. 10A illustrates a block diagram for a coarse carrier frequency offset estimation process according to an embodiment herein.

FIG. 10A illustrates a block diagram 1000 for a coarse carrier frequency offset estimation process in accordance with an embodiment. After the TDM pilot 1 location has been determined, the coarse carrier frequency offset is estimated. A counter 1010 is used to count the number of times a peak within a chunk is repeated. An indexer 1015 is used to get the index of maximum count of the counter 905. The index with the maximum count is declared as a candidate coarse frequency offset. This value is within {+/−32n, n= . . . , −2, −1, 0, 1, 2 . . . } sub-carriers from the correct coarse frequency offset, since all these possible offsets result in the same pattern within a chunk. The output of the indexer 1015 is provided to a cyclic shifter 1020, which cyclically shifts the estimated TDM pilot 1 symbol either to the left or the right by +/−32n corresponding to +/− sign of the offset with this value. The resulting symbol from the cyclic shifter 1020 is divided by the ideal TDM pilot 1 by a divider 1025. For the correct shift, this should result in an estimate of the channel in the frequency domain. From the result of the division a 128-point Inverse Fast Fourier Transform (IFFT) is computed by an IFFT process 1030. For the correct TDM pilot 1, this should be the channel in the time domain which should be very sparse. A sparseness calculator 1035 is used to compute the sparseness index. The sparseness index calculation algorithm used in DVB-H may be used to estimate the degree of sparseness of the resulting channel estimate and the offset which results in the most spears channel estimate is declared as a correct one. The correct coarse frequency offset corresponds to the channel with the highest sparseness.

FIG. 10B is a flow diagram illustrating one embodiment of a method 1050 for estimating coarse frequency offset in a MediaFLO™ system. At block 1055, the number of times a value of a peak is repeated is counted by the counter 1005 of FIG. 10A, and an index of the peak with the maximum count is obtained, and the index with the maximum count is set as a candidate coarse frequency offset. Next, at block 1060, the estimated TDM pilot 1 symbol is shifted by each possible frequency offset +/−32n for all possible values of n. Next, at block 1065, the resulting symbol is divided by the ideal transmitted TDM pilot 1. Moving to block 1070, the 128-point IFFT for the resulting symbol after division is computed. At block 1075, the sparseness of all the time domain channels for all possible offsets is compared. Next, at block 1080, a correct coarse frequency offset corresponding to the highest sparseness channel is obtained.

FIG. 11, with reference to FIGS. 1 through 10B, is a flow diagram illustrating a method of performing timing and frequency estimation in a MediaFLO™ mobile multimedia multicast system 100 comprising a receiver 120 and a transmitter 110 according to an embodiment herein, wherein the method comprises receiving (1101) a wireless data stream comprising a MediaFLO™ mobile multimedia multicast system superframe 300 comprising OFDM symbols; estimating (1103) a FFT trigger point 522 for each of the received OFDM symbols; estimating (1105) a fine carrier frequency offset of each of the received OFDM symbols; determining (1107) the start of the MediaFLO™ mobile multimedia multicast system superframe 300 by locating a TDM pilot symbol 302 in the superframe 300; estimating (1109) a coarse carrier frequency offset of each of the received OFDM symbols; and synchronizing (1111) the receiver 120 to the start of the MediaFLO™ mobile multimedia multicast system superframe 300 and the transmitted OFDM symbols based on the fine carrier frequency offset, the TDM pilot symbol 302, and the coarse carrier frequency offset.

Preferably, estimating (1103) the FFT trigger point 522 for each of the received OFDM symbols comprises receiving OFDM signal samples; delaying and conjugating a received signal sample; correlating the received signal sample with the delayed and conjugated signal sample; applying a moving average process to the result of the correlation; accumulating each symbol duration; and determining if N symbols have been accumulated, wherein N comprises a number of OFDM symbols. Moreover, the method may further comprise detecting a peak of a resulting OFDM symbol from the moving average process; and storing an index of the detected peak. Additionally, estimating (1105) the fine carrier frequency offset of each the received OFDM symbols may comprise obtaining an angle of a detected peak of a resulting OFDM symbol; and computing a frequency offset $\Delta f$.

Preferably, the computing of the frequency offset $\Delta f$ is derived using an angle of peak of a correlator output equaling to $2\pi \Delta f\, N_{FFT}/f_s$. Also, the location of the TDM pilot symbol 302 may be determined by initializing a sparseness index value and a symbol number value to zero; dividing the received OFDM symbols into 125 chunks 805 of 32 carriers each; determining the value and location of a peak 810 within a chunk 805 for each of the chunks 805, except for the first and the last three chunks 805; incrementing a counter 862 corresponding to the number of location of peaks 810 of the chunks 805 is repeated; accumulating the power of the peak 810 into a first peak power accumulator 865 and the power within a remainder of the chunk 815 into a second accumulator 870; determining a sparseness index ratio, wherein the sparseness index ratio comprises a ratio of the power in the peaks 810 to the power in the remainder of the chunks 815; and determining whether the sparseness index ratio is greater then the sparseness index value.

The method may further comprise setting the sparseness index value equal to the sparseness index ratio; and determining if the symbol number is equal to 1200. Additionally, the method may further comprise obtaining the TDM pilot symbol of the OFDM symbol having the highest sparseness index value. Moreover, the estimating (1109) of the coarse carrier frequency offset of each of the received OFDM symbols may comprise counting the number of times a value of a peak of the OFDM symbols is repeated; obtaining an index of the peak with the maximum count, and setting the index with the maximum count as a candidate coarse frequency offset; shifting the TDM pilot symbol by each possible frequency offset; dividing the shifted TDM pilot symbol by an ideal transmitted TDM pilot symbol; computing a 128-point IFFT process of the result of the division process; computing a sparseness of a transmission channel of the wireless data stream in a time domain for all possible offsets; and obtaining a correct coarse frequency offset corresponding to the transmission channel with the highest sparseness value.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of an entirely hardware embodiment, an entirely software embodiment or an embodiment including both hardware and software elements. The embodiments that are implemented in software include but are not limited to, firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 12:
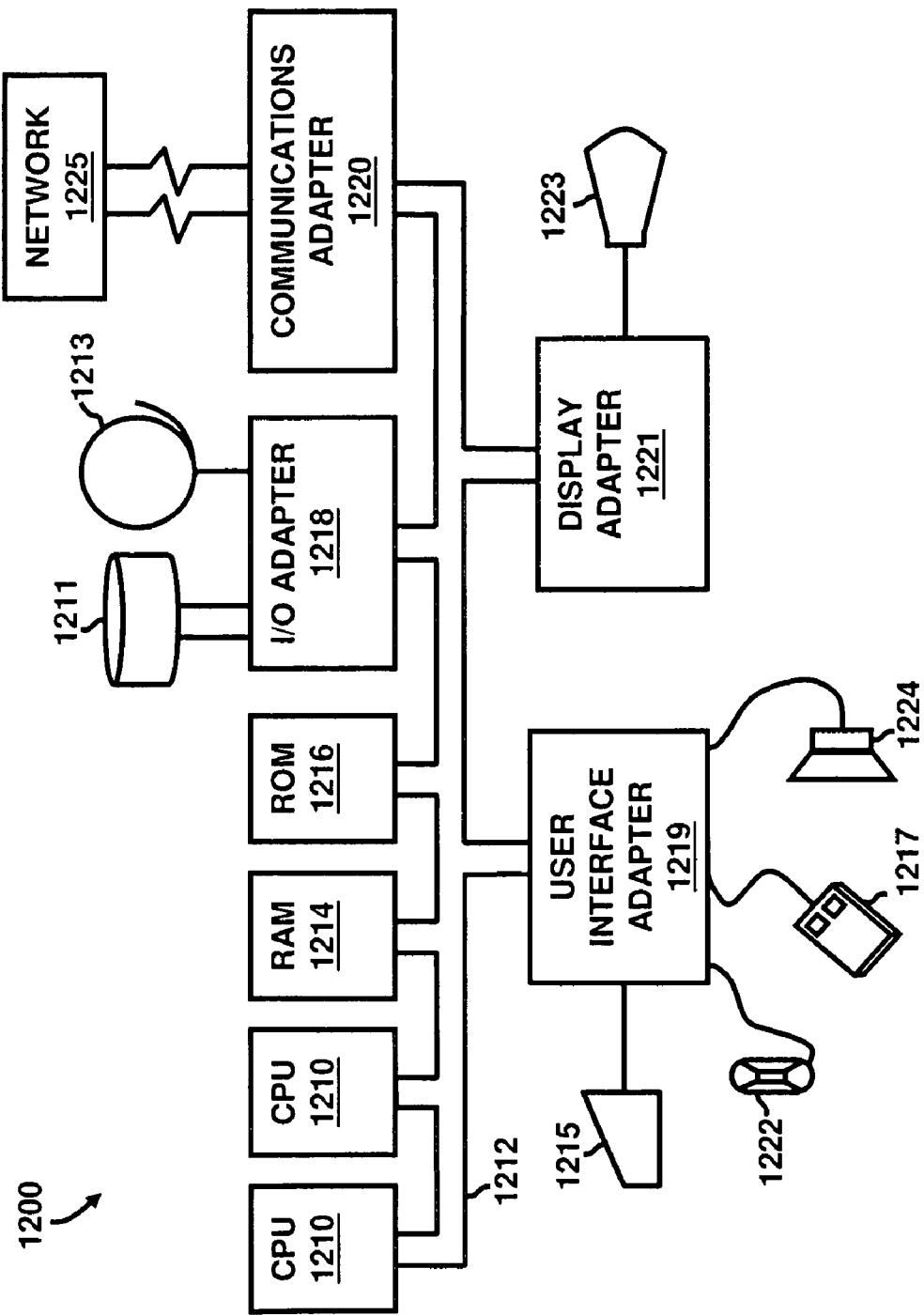
FIG. 12 illustrates a schematic diagram of a computer architecture used in accordance with the embodiments herein.

A representative hardware environment for practicing the embodiments herein is depicted in FIG. 12. This schematic drawing illustrates a hardware configuration of an information handling/computer system 1200 in accordance with the embodiments herein. The system 1200 comprises at least one processor or central processing unit (CPU) 1210. The CPUs 1210 are interconnected via system bus 1212 to various devices such as a random access memory (RAM) 1214, read-only memory (ROM) 1216, and an input/output (I/O) adapter 1218. The I/O adapter 1218 can connect to peripheral devices, such as disk units 1211 and tape drives 1213, or other program storage devices that are readable by the system 1200. The system 1200 can read the inventive instructions on the program storage devices and follow these instructions to execute the methodology of the embodiments herein. The system 1200 further includes a user interface adapter 1219 that connects a keyboard 1215, mouse 1217, speaker 1224, microphone 1222, and/or other user interface devices such as a touch screen device (not shown) to the bus 1212 to gather user input. Additionally, a communication adapter 1220 connects the bus 1212 to a data processing network 1225, and a display adapter 1221 connects the bus 1212 to a display device 1223 which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method of performing timing and frequency estimation in a MediaFLO™ (Forward Link Only) mobile multimedia multicast system comprising a receiver and a transmitter, said method comprising:

receiving a wireless data stream comprising a MediaFLO™ mobile multimedia multicast system superframe comprising Orthogonal Frequency Division Multiplexing (OFDM) symbols;

estimating a Fast Fourier Transform (FFT) trigger point for each of the received OFDM symbols;

estimating a fine carrier frequency offset of each of the received OFDM symbols by:
 obtaining an angle of a detected peak of a resulting OFDM symbol; and
 computing a frequency offset $\Delta f$ by using an angle of peak of a correlator output equaling to $2\pi\Delta f N_{FFT}/f_s$, wherein said $N_{FFT}$ corresponds to a FFT size and said $f_s$ corresponds to a chip rate;

determining the start of said MediaFLO™ mobile multimedia multicast system superframe by locating a Time Division Multiplexed (TDM) pilot symbol in said superframe;

estimating a coarse carrier frequency offset of each of the received OFDM symbols; and synchronizing said receiver to said start of said MediaFLO™ mobile multimedia multicast system superframe and the transmitted OFDM symbols based on said fine carrier frequency offset, said TDM pilot symbol, and said coarse carrier frequency offset.

2. The method of claim 1, wherein estimating said FFT trigger point for each of the received OFDM symbols comprises:

receiving OFDM signal samples;

delaying and conjugating a received signal sample;

correlating the received signal sample with the delayed and conjugated signal sample;

applying a moving average process to the result of the correlation;

accumulating each symbol duration; and determining if N symbols have been accumulated, wherein N comprises a number of OFDM symbols.

3. The method of claim 2, further comprising:

detecting a peak of a resulting OFDM symbol from said moving average process; and storing an index of the detected peak.

4. The method of claim 1, wherein the location of said TDM pilot symbol is determined by:

initializing a sparseness index value and a symbol number value to zero;

dividing the received OFDM symbols into 125 chunks of 32 carriers each;

determining the value and location of a peak within a chunk for each of said chunks, except for the first and the last three chunks;

incrementing a counter corresponding to the number of location of peaks of said chunks is repeated;

accumulating the power of said peak into a first peak power accumulator and the power within a remainder of said chunk into a second accumulator;

determining a sparseness index ratio, wherein said sparseness index ratio comprises a ratio of the power in said peaks to the power in the remainder of said chunks; and
determining whether said sparseness index ratio is greater then said sparseness index value.

5. The method of claim 4, further comprising:
setting said sparseness index value equal to said sparseness index ratio; and
determining if said symbol number is equal to 1200.

6. The method of claim 4, further comprising obtaining said TDM pilot symbol of said OFDM symbol having the highest sparseness index value.

7. The method of claim 1, wherein the estimating of said coarse carrier frequency offset of each of the received OFDM symbols comprises:
counting the number of times a value of a peak of said OFDM symbols is repeated;
obtaining an index of said peak with the maximum count, and setting said index with the maximum count as a candidate coarse frequency offset;
shifting said TDM pilot symbol by each possible frequency offset;
dividing the shifted TDM pilot symbol by an ideal transmitted TDM pilot symbol;
computing a 128-point Inverse Fast Fourier Transform (IFFT) process of the result of the division process;
computing a sparseness of a transmission channel of said wireless data stream in a time domain for all possible offsets; and
obtaining a correct coarse frequency offset corresponding to the transmission channel with the highest sparseness value.

8. Logic encoded in one or more non-transitory tangible media for execution and operatively connected to a MediaFLO™ (Forward Link Only) mobile multimedia multicast-system receiver, and when executed, said logic operable for:
receiving a wireless data stream comprising a MediaFLO™ mobile multimedia multicast system superframe comprising Orthogonal Frequency Division Multiplexing (OFDM) symbols; estimating a Fast Fourier Transform (FFT) trigger point for each of the received OFDM symbols; estimating a fine carrier frequency offset of each of the received OFDM symbols by:
obtaining an angle of a detected peak of a resulting OFDM symbol; and
computing a frequency offset deltaf by using an angle of peak of a correlator output equaling to 2 pi delta/Nfft/fs, wherein said Nfft corresponds to a FFT size and said fs corresponds to a chip rate;
determining the start of said MediaFLO™ mobile multimedia multicast system superframe by locating a Time Division Multiplexed (TDM) pilot symbol in said superframe;
estimating a coarse carrier frequency offset of each of the received OFDM symbols; and
synchronizing said receiver to said start of said MediaFLO™ mobile multimedia multicast system superframe and the transmitted OFDM symbols based on said fine carrier frequency offset, said TDM pilot symbol, and said coarse carrier frequency offset.

9. Logic of claim 8, wherein estimating said FFT trigger point for each of the received OFDM symbols comprises:
receiving OFDM signal samples;
delaying and conjugating a received signal sample;
correlating the received signal sample with the delayed and conjugated signal sample;
applying a moving average process to the result of the correlation;
accumulating each symbol duration; and
determining if N symbols have been accumulated, wherein N comprises a number of OFDM symbols.

10. Logic of claim 9, further operable for:
detecting a peak of a resulting OFDM symbol from said moving average process; and
storing an index of the detected peak.

11. Logic of claim 8, wherein the location of said TDM pilot symbol is determined by:
initializing a sparseness index value and a symbol number value to zero;
dividing the received OFDM symbols into 125 chunks of 32 carriers each;
determining the value and location of a peak within a chunk for each of said chunks, except for the first and the last three chunks;
incrementing a counter corresponding to the number of location of peaks of said chunks is repeated;
accumulating the power of said peak into a first peak power accumulator and the power within a remainder of said chunk into a second accumulator;
determining a sparseness index ratio, wherein said sparseness index ratio comprises a ratio of the power in said peaks to the power in the remainder of said chunks; and
determining whether said sparseness index ratio is greater then said sparseness index value.

12. Logic of claim 11, further operable for:
setting said sparseness index value equal to said sparseness index ratio; and
determining if said symbol number is equal to 1200.

13. Logic of claim 11, further operable for obtaining said TDM pilot symbol of said OFDM symbol having the highest sparseness index value.

14. Logic of claim 8, wherein the estimating of said coarse carrier frequency offset of each of the received OFDM symbols comprises:
counting the number of times a value of a peak of said OFDM symbols is repeated;
obtaining an index of said peak with the maximum count, and setting said index with the maximum count as a candidate coarse frequency offset;
shifting said TDM pilot symbol by each possible frequency offset;
dividing the shifted TDM pilot symbol by an ideal transmitted TDM pilot symbol;
computing a 128-point Inverse Fast Fourier Transform (IFFT) process of the result of the division process;
computing a sparseness of a transmission channel of said wireless data stream in a time domain for all possible offsets; and
obtaining a correct coarse frequency offset corresponding to the transmission channel with the highest sparseness value.

15. An apparatus for performing timing and frequency estimation in a MediaFLO™ (Forward Link Only) mobile multimedia multicast system comprising a receiver and a transmitter, said apparatus comprising a processor adapted to:
receive a wireless data stream comprising a MediaFLO™ mobile multimedia multicast system superframe comprising Orthogonal Frequency Division Multiplexing (OFDM) symbols;
estimate a Fast Fourier Transform (FFT) trigger point for each of the received OFDM symbols;
estimate a fine carrier frequency offset of each of the received OFDM symbols by:

obtaining an angle of a detected peak of a resulting OFDM symbol; and computing a frequency offset Δf by using an angle of peak of a correlator output equaling $2\pi\Delta f N_{FFT}/f_s$, wherein said $N_{FFT}$ corresponds to a FFT size and said $f_s$ corresponds to a chip rate;

determine the start of said MediaFLO™ mobile multimedia multicast system superframe by locating a Time Division Multiplexed (TDM) pilot symbol in said superframe;

estimate a coarse carrier frequency offset of each of the received OFDM symbols; and synchronize said receiver to said start of said MediaFLO™ mobile multimedia multicast system superframe and the transmitted OFDM symbols based on said fine carrier frequency offset, said TDM pilot symbol, and said coarse carrier frequency offset.

16. The apparatus of claim 15, wherein the location of said TDM pilot symbol is determined by:

initializing a sparseness index value and a symbol number value to zero;

dividing the received OFDM symbols into 125 chunks of 32 carriers each;

determining the value and location of a peak within a chunk for each of said chunks, except for the first and the last three chunks;

incrementing a counter corresponding to the number of location of peaks of said chunks is repeated;

accumulating the power of said peak into a first peak power accumulator and the power within a remainder of said chunk into a second accumulator;

determining a sparseness index ratio, wherein said sparseness index ratio comprises a ratio of the power in said peaks to the power in the remainder of said chunks; and determining whether said sparseness index ratio is greater then said sparseness index value.

17. The apparatus of claim 16, further comprising:

setting said sparseness index value equal to said sparseness index ratio; and determining if said symbol number is equal to 1200.

18. The apparatus of claim 16, further comprising obtaining said TDM pilot symbol of said OFDM symbol having the highest sparseness index value.

19. The apparatus of claim 15, wherein said estimate of said FFT trigger point for each of the received OFDM symbols comprises:

receiving OFDM signal samples;

delaying and conjugating a received signal sample;

correlating the received signal sample with the delayed and conjugated signal sample;

applying a moving average process to the result of the correlation;

accumulating each symbol duration; and determining if N symbols have been accumulated, wherein N comprises a number of OFDM symbols.

20. The apparatus of claim 19, further comprising:

detecting a peak of a resulting OFDM symbol from said moving average process; and storing an index of the detected peak.

* * * * *